(12) United States Patent
Takagi et al.

(10) Patent No.: US 6,632,910 B2
(45) Date of Patent: Oct. 14, 2003

(54) COVERING MATERIAL

(75) Inventors: Yasuyuki Takagi, Ibaraki (JP); Hiroaki Takahata, Toyonaka (JP); Nobuo Oi, Narashino (JP)

(73) Assignee: Sumitomo Chemical Company, Limited, Osaka (JP)

( * ) Notice: Subject to any disclaimer, the term of this patent is extended or adjusted under 35 U.S.C. 154(b) by 26 days.

(21) Appl. No.: 09/827,944

(22) Filed: Apr. 9, 2001

(65) Prior Publication Data

US 2001/0053455 A1 Dec. 20, 2001

(30) Foreign Application Priority Data

Apr. 12, 2000 (JP) ......................................... 2000-110686

(51) Int. Cl.[7] ............................................. C08F 212/08
(52) U.S. Cl. .................... 526/347; 526/308; 526/348.1; 526/348
(58) Field of Search ............................. 526/308, 348.1, 526/347, 348

(56) References Cited

U.S. PATENT DOCUMENTS 5,800,631 A * 9/1998 Yamada et al. .............. 136/251
5,814,326 A * 9/1998 Senda et al. ................. 424/411

FOREIGN PATENT DOCUMENTS

| EP | 1 002 808 A1 | 5/2000 |
| EP | 0 970 976 A1 | 12/2000 |
| JP | 11-010810 | 1/1999 |
| WO | WO 98/44043 | 10/1998 |
| WO | WO 99/46327 | 9/1999 |

* cited by examiner

Primary Examiner—Ling-Siu Choi
(74) Attorney, Agent, or Firm—Pillsbury Winthrop LLP

(57) ABSTRACT

The present invention provides a covering material having a layer formed of a resin of which glass transition point is in the range of 10° C. to 50° C., said covering material having excellent shape keeping ability and shape recovering ability after deformation.

2 Claims, 2 Drawing Sheets

COVERING MATERIAL

CROSS-REFERENCE TO RELATED APPLICATIONS

This claims priority to Japanese Patent Application No. 2000-110686, filed Apr. 12, 2000, the contents of which are incorporated herein in their entirety by reference.

BACKGROUND OF THE INVENTION

1. Field of the Invention

The present invention relates to a plastic covering material having excellent shape keeping ability for sealing containers such as cup, bowl and tray formed of paper, synthetic resin and the like.

2. Description of the Prior Art

Conventionally, as materials for a covering material which is bonded to an opening of a container made of paper, synthetic resin and the like for accommodating beverages, portions, foods such as instant noodles, or medical devices such as disposable contact lens for sealing the container, aluminum foils and polypropylene polymers have been widely used.

The reason why aluminum foils are used in the covering material as described above is that in addition to shielding the light and air thereby protecting the contents, the covering material has ability to keep a turned-up shape (shape keeping ability) in the case where the covering material is partly torn off and then the contents are taken from the container or hot water is poured into the container.

As an alternative of such conventional covering materials having aluminum foil layer, a covering material formed of a plastic in its entirety has bean proposed. For example, in Japanese Unexamined Patent Publication JP 11-01810 A (1999), a covering material which is formed by punching a laminated material into a predetermined shape is disclosed, the laminated material being configured by laminating heat resistant films on both sides of a base material of a co-extruded film having a center layer made of high-density polyethylene and polypropylene-based polymer and coating layers made of high-density polyethylene on both sides of the center layer to make a lamination base material, and providing a sealant layer on the bottom surface of the lamination base material. However, such conventional plastic covering materials did not have sufficient shape keeping ability. That is, the ability of the conventional covering materials to keep the deformed condition when they are deformed, for example, by bending was not satisfactory. Furthermore, the conventional covering materials did not have sufficient shape recovering ability after deformation. That is, it was difficult for the conventional covering materials to recover the condition before deformation without causing damages such as folding or wrinkles.

SUMMARY OF THE INVENTION

It is an object of the present invention to provide a plastic covering material having excellent shape keeping ability and shape recovering ability after deformation.

As the result of researches for developing a plastic covering material having excellent shape keeping ability and shape recovering ability after deformation, the inventors of the present invention found that a covering material having a layer formed of a resin of which glass transition point is in the range of 10° C. to 50° C. satisfies the above-mentioned object and accomplished the present invention.

Further scope of applicability of the present invention will become apparent from the detailed description given hereinafter. However, it should be understood that the detailed description and specific examples, while indicating referred embodiments of the invention, are given by way of illustration only, since various changes and modifications within the spirit and scope of the invention will become apparent to those skilled in the art from this detailed description.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step.

DETAILED DESCRIPTION OF THE INVENTION

Figure 1:
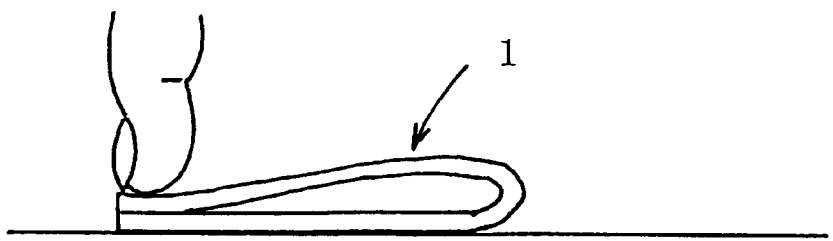
FIG. 1 is a schematic view for explaining procedure of a shape keeping test (1) of covering material.
Figure 1:
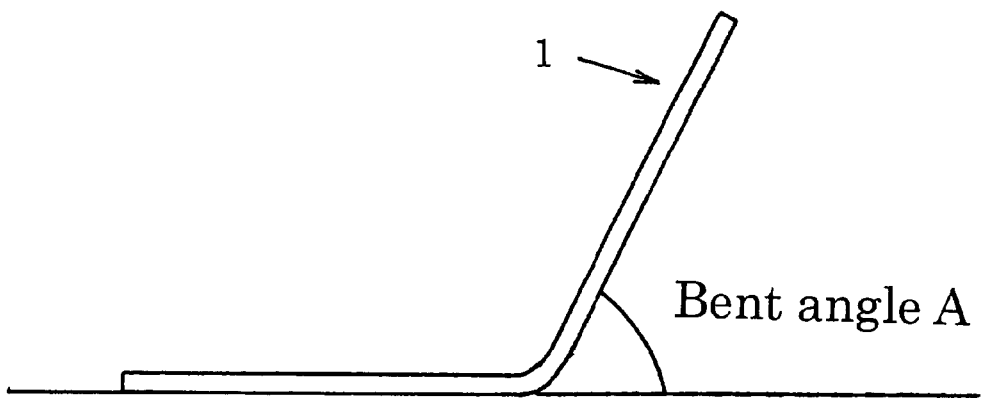

A covering material of the present invention is characterized by having a layer formed of a resin of which glass transition point is in the range of 10° C. to 50° C.

Glass transition point (hereinafter, also referred to as Tg) means the boundary temerature that a resin being heated transits from the glass state to the rubber state, and is observed as an inflection point of a DSC curve which corresponds to the step-wise change in the specific heat capacity in measurement using a differential scanning calorimeter (DSC).

The covering material of the present invention has a layer formed of a resin of which glass transition point is in the range of 10° C. to 50° C., with the result that it is excellent in the shape keeping ability. The glass transition point is referably in the range of 15° C. to 45° C., more referably in the range of 20° C. to 45° C., and most preferably in the range of 25° C. to 40° C.

It is preferred that the resin of which glass transition point is in the range of 10° C. to 50° C. is an amorhous resin from the view point of the shape recovering ability after deformation. The covering material having a layer formed of an amorhous resin of which glass transition point is in the range of 10° C. to 50° C. is excellent in shape recovering ability. That is, even if the sheet is folded, it can recover the condition before the folding without leaving any wrinkles. Incidentally, when an endothermic peak or a melting point is not observed in measuring a resin using a differential scanning calorimeter (DSC), the resin is judged as amorhous.

In the present invention, structure of the resin of which glass transition point is in the range of 10° C. to 50° C. is not particularly limited, and the resin may be copolymers formed by polymerizing (a) ethylene and/or α-olefin and (b) cyclic olefin and/or alkenyl aromatic hydrocarbon. The glass transition point of such a resin may be adjusted in the range of 10° C. to 50° C. by changing the copolymerization composition of the resin.

The above-mentioned "ethylene and/or α-olefin" means either one of ethylene alone, α-olefin alone or combination of ethylene and α-olefin, with ethylene alone being particularly referred. Further, the above-mentioned "cyclic olefin and/or alkenyl aromatic hydrocarbon" means either on of cyclic olefin alone, alkenyl aromatic hydrocarbon alone, or combination of cyclic olefin and alkenyl aromatic hydrocarbon.

As the α-olefin in the copolymer, α-olefins having from 3 to 20 carbon atoms are preferred. Typically, examples thereof include linear α-olefins such as proylene, butene-1, pentene-1, hexene-1, hetene-1, octene-1, nonene-1 and decene-1, branched α-olefins such as 3-methylbutene-1, 3-methylpentene-1, 4-methylpentene-1 and 5-methylhexene-1, vinylcyclohexane and the like. More preferred α-olefins are proylene, butene-1, pentene-1, hexene-1, heptene-1, octene-1, 4-methylpentene-1 and vinylcyclohexane. Among them, proylene is particularly preferred.

α-olefin may be used alone or in combination of two or more kinds.

In the copolymers formed by polymerizing (a) ethylene and/or α-olefin and (b) cyclic olefin and/or alkenyl aromatic hydrocarbon, the cyclic olefin refers to a compound having a ring consisting of 4 or more carbon atoms and including one carbon—carbon double bond in the ring. Such cyclic olefin may have various kinds of substituents. Examples of such cyclic olefin include: monocyclic olefins such as cyclobutene, cycloentene, cyclohexene and cyclooctene; substituted monocyclic olefins such as 3-methylcycloentene, 4-methylcyclopentene and 3-methylcyclohexene; polycyclic olefins such as norbornene, 1,2-dihydrodicyclopentadiene and tetracyclododecene; and substituted polycyclic olefins such as 5-methylnorbornene.

Preferred cyclic olefins among these are compounds represented by the following general formula [IV].

[IV]

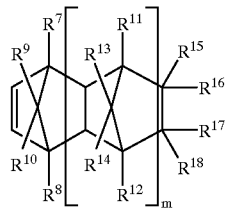

(Wherein $R^7$ to $R^{18}$ independently represent hydrogen atom, hydroxyl group, amino group, phosphino group, or organic group having 1–20 carbon atoms, and $R^{16}$ and $R^{17}$ may be bonded to each other to form a ring. "m" represents an integer of 0 or more.)

Concrete examples of the organic group having 1 to 20 carbon atoms which is one member of the substituents include: alkyl groups such as methyl group, ethyl group, propyl group, butyl group, hexyl group, octyl group and dodecyl group; aryl groups such as phenyl group, tolyl group and naphthyl group; aralkyl groups such as benzyl group and phenetyl group; alkoxy groups such as methoxy group and ethoxy group; aryloxy groups such as phenoxy group; acyl groups such as acetyl group; alkoxycarbonyl groups such as methoxycarbonyl group and ethoxycarbonyl group; aryloxycarbonyl groups such as phenoxycarbonyl group; aralkyloxycarbonyl groups such as benzyloxycarbonyl group; acyloxy groups such as acetyloxy group; alkoxysulfonyl groups such as methoxysulfonyl group and ethoxysulfonyl group; aryloxysulfonyl groups such as phenoxysulfonyl group; aralkyloxysulfonyl groups such as benzyloxysulfonyl group; substituted silyl groups such as trimethylsilyl group; dialkylamino groups such as dimethylamino group and diethylamino group; carboxyl groups; cyano groups; and groups in which art of hydrogen atoms of said alkyl groups, aryl groups and aralkyl groups are substituted by hydroxyl groups, amino groups, acyl groups, carboxyl groups, alkoxy groups, alkoxycarbonyl groups, acyloxy groups, substituted silyl groups, alkylamino groups or cyano groups.

Preferably, $R^7$ to $R^{18}$ are independently hydrogen atom, alkyl groups having 1–20 carbon atoms, aryl groups having 1–20 carbon atoms, aralkyl groups having 7–20 carbon atoms; acyl groups having 1–20 carbon atoms, alkoxycarbonyl groups having 1–20 carbon atoms, acyloxy groups having 1–20 carbon atoms or di-substituted silyl groups having 1–20 carbon atoms.

m is an integer of 0 or more, and referably an integer in the range of $0 \leq m \leq 3$.

Concrete examples of cyclic olefin represented by the general formula [IV] include norbornene, 5-methylnorbornene, 5-etylnorbornene, 5-butylnorbornene, 5-phenylnorbornene, 5-benzylnorbornene, tetracyclododecene, tricyclodecene, tricycloundecene, pentacyclopentadecene, pentacyclohexadecene, 8-methyltetracyclododecene, 8-ethyltetracyclododecene, 5-acetylnorbornene, 5-acetyloxynorbornene, 5-methoxycarbonylnorbornene, 5-ethoxycarbonylnorbornene, 5-metyl-5-methoxycarbonylnorbornene, 5-cyanonorbornene, 8-methoxycarbonyltetracyclododecene, 8-methyl-8-tetracyclododecene, 8-cyanotetracyclododecene and the like.

In polymerization, these cyclic olefins may be used alone or in plural.

In the above-mentioned copolymers formed by polymerizing (a) ethylene and/or α-olefin and (b) cyclic olefin and/or alkenyl aromatic hydrocarbon, the alkenyl aromatic hydrocarbon is referably compounds represented by the following general formula [V].

[V]

(wherein $R^{19}$ represents a hydrogen atom or alkyl groups having 1–20 carbon atoms, and Ar represents aromatic hydrocarbon groups having 6–25 carbon atoms.)

$R^{19}$ is a hydrogen atom or alkyl groups having 1–20 carbon atoms, and concrete example of the alkyl groups having 1–20 carbon atoms include methyl group, ethyl group, propyl group, butyl group, hexyl group, octyl group, dodecyl group and the like. $R^{19}$ is preferably a hydrogen atom or methyl group.

Ar is aromatic hydrocarbon groups having 6–25 carbon atoms, and concrete examples of the aromatic hydrocarbon groups having 6–25 carbon atoms include phenyl group, tolyl group, xylyl group, tertiary butylphenyl group, vinylphenyl group, naphthyl group, phenanthryl group, anthracenyl group, benzyl group and the like. Phenyl group, tolyl group, xylyl group, tertiary butylphenyl group, vinylphenyl group or naphthyl group is preferred.

Concrete examles of the alkenyl aromatic hydrocarbon include: alkylstyrenes such as p-methylstyrene, m-methylstyrene, o-methylstyrene, p-ethylstyrene, m-ethylstyrene, o-ethylstyrene, 2,4-dimethylstyrene, 2,5-dimethylstyrene, 3,4-dimethylstyrene, 3,5-dimethylstyrene, 3-methyl-5-ethylstyrene, p-tertiary butylstyrene and p-secondary butylstyrene; alkenylbenzenes such as styrene, 2-henylpropyrene, 2-phenylbuthene and 3-phenylpropyrene; bisalkenylbenzenes such as divinylbenzen; and alkenylnaphthalenes such as 1-vinylnaphthalene. As the alkenyl aromatic hydrocarbon, styrene, p-methylstyrene, m-methylstyrene, o-methylstyrene, p-tertiary butylstyrene, 2-phenylpropyrene, or 1-vinylnaphthalene is preferred, and styrene is particularly preferred.

In the present invention, preferred resins as the resin having a glass transition point in the range of 10° C. to 50° C. are: copolymers of (a) ethylene and/or α-olefin and (b1) cyclic olefin; copolymers of (a) ethylene and/or α-olefin and (b2) alkenyl aromatic hydrocarbon; and copolymers of (a) ethylene and/or α-olefin and both of (b1) cyclic olefin and (b2) alkenyl aromatic hydrocarbon, with copolymers of ethylene and/or α-olefin and both of (b1) cyclic olefin and (b2) alkenyl aromatic hydrocarbon being particularly preferred.

In a copolymer containing cyclic olefin as a copolymerization component, copolymerization composition of the cyclic olefin is preferably in the range of 0.01 to 40 mol %. In the case where the copolymerization composition of the cyclic olefin falls within this range, the copolymer is excellent particularly in oil resistance and heat resistance. The copolymerization composition of the cyclic olefin is more preferably in the range of 0.1 to 30 mol %, and most preferably in the range of 1 to 20 mol %. The copolymerization composition of cyclic olefin can be readily determined by $^1$H-NMR sectrum or 13C-NMR spectrum.

In a copolymer containing alkenyl aromatic hydrocarbon as a copolymerization component, copolymerization composition of the alkenyl aromatic hydrocarbon is preferably in the range of 1 to 70 mol %. In the case where the copolymerization composition of the alkenyl aromatic hydrocarbon falls within this range, the copolymer is excellent particularly in heat resistance and flexibility and has high refractive index. The copolymerization composition of the alkenyl aromatic hydrocarbon is more preferably in the range of 3 to 55 mol %, and most preferably in the range of 5 to 45 mol %. The copolymerization composition of alkenyl aromatic hydrocarbon can be readily determined by $^1$H-NMR sectrum or $^{13}$C-NMR spectrum.

In a copolymer of (a) ethylene and/or α-olefin and both of (b1) cyclic olefin and (b2) alkenyl aromatic hydrocarbon that may be used in the present invention, copolymerization composition of the alkenyl aromatic hydrocarbon is preferably more than a half of copolymerization composition of the cyclic olefin. The copolymerization composition of the alkenyl aromatic hydrocarbon is more preferably more than or equal to the copolymerization composition of the cyclic olefin. In the case where the copolymerization composition of the alkenyl aromatic hydrocarbon falls within this range, the copolymer is excellent in balance of solvent resistance, heat resistance and flexibility.

In the present invention, as the resin having a glass transition point in the range of 10° C. to 50° C., copolymers in which diene is copolymerized in addition to ethylene and/or α-olefin, cyclic olefin, and alkenyl aromatic hydrocarbon may be used. As such diene, bisalkenyl aromatic hydrocarbon, cyclic diene, linear diene, branched diene and the like can be exemplified, however, bisalkenyl aromatic hydrocarbon, cyclic diene and branched diene are preferred, bisalkenyl aromatic hydrocarbon and cyclic diene are more preferred, and among them bisalkenyl aromatic hydrocarbon is most preferred. As the bisalkenyl aromatic hydrocarbon, divinylbenzene, divinylnaphthalene, divinylbiphenyl, diallylbenzene and the like can be exemplified. As the cyclic diene, norbornadiene, dicyclopentadiene, vinylnorbornene, vinylcyclohexene, ethylidene norbornene and the like can be exemplified. As the linear diene, 1,5-hexadiene, 1,7-octadiene and the like can be exemplified. As the branched diene, isorene and the like can be exemplified.

In the present invention, as the resin having a glass transition point in the range of 10° C. to 50° C., copolymers in which other vinyl compound is copolymerized in addition to ethylene and/or α-olefin, cyclic olefin, and alkenyl aromatic hydrocarbon may be used. Concrete examples of such vinyl compound include methylvinylether, ethylvinylether, acrylic acid, methyl acrylate, methyl methacrylate, acrylonitrile, vinyl acetate and the like.

There is no particular limitation in the process for producing the copolymer of (a) ethylene and/or an α-olefin and (b) a cyclic olefin and/or an alkenyl aromatic hydrocarbon in the resent invention. There may be applied various kinds of methods, for example, a gas phase polymerization in a batch or continuous system, a bulk polymerization method, a solution or slurry polymerization method using an adequate solvent. As a polymerization catalyst, for example, non-uniform Ziegler catalysts, metallocene-based catalysts disclosed in Japanese Patent Laid-Open Publications No. Hei-3-250007, Hei 7-70223, Hei 9-309925, Hei 9-87313 and Hei 9-183809, WO98/09999, non-metallocene catalysts and these like metal catalysts and the like may be used, but the catalyst is not restricted to these ones. In the polymerization, a chain transfer agent such as hydrogen may be used for the purpose of the adjustment of a molecular weight of the copolymer.

As the above metal catalysts are used metallocene-based catalysts, and among them a catalyst prepared from the following transition metal complex (A), the following Aluminum compound (B) and/or the following Boron compound (C) is particularly more preferred.

(A): The transition metal complex represented by the following general formulas [I], [II] or [III]:

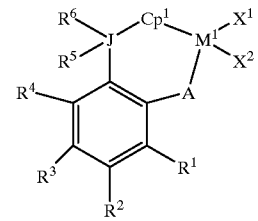

[I]

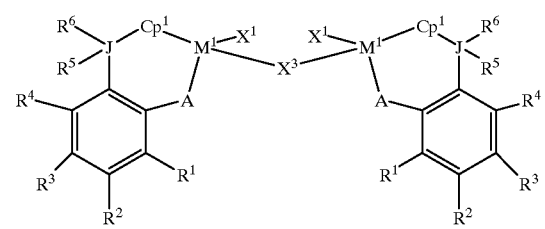

[II]

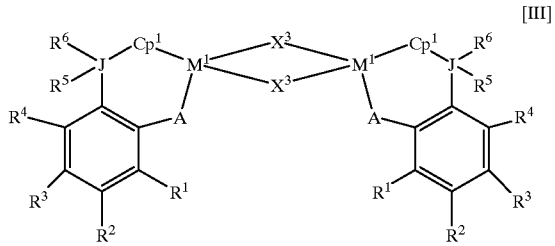

[III]

In the general formulas [I], [II] and [III], $M^1$ represents a transition metal atom of Group 4 of the Periodic Table of Elements, A represents an atom of Group 16 of the Periodic Table of Elements, J represents an atom of Group 14 of the Periodic Table of Elements, and C represents a group having a cycloentadiene-type anion skeleton. $X^1$, $X^2$, $R^1$, $R^2$, $R^3$, $R^4$, $R^5$ and $R^6$ independently represent a hydrogen atom, a halogen atom, an alkyl group, an aralkyl group, an aryl group, a substituted silyl group, an alkoxy group, an aralkyloxy group, an aryloxy group or a di-substituted amino group. $X^3$ represents an atom of Group 16 of the Periodic Table of Elements. $R^1$, $R^2$, $R^3$, $R^4$, $R^5$ and $R^6$ may arbitrarily be combined to form a ring. The two $M^1$s, As, Js, $Cp^1$s, $X^1$s, $X^2$s, $X^3$s, $R^1$s, $R^2$s, $R^3$s, $R^4$s, $R^5$s or $R^6$s in the general formula [II] or [III] may be either the same or different. (B): At least one aluminum compound selected from the following (B1) to (B3):

(B1) An organoaluminum compound represented by the general formula $E^1_a AlZ_{3-a}$ (B2) A cyclic aluminoxane having a structure represented by the general formula $\{-Al(E^2)-O-\}_b$ (B3) A linear aluminoxane having a structure represented by the general formula $E^3\{-Al(E^3)-O-\}_c AlE^3_2$ In the above general formulas, $E^1$, $E^2$ and $E^3$ each indicates a hydrocarbon group, and all $E^1$s, all $E^2$s and all $E^3$s may be either the same or different. Z represents a hydrogen atom or a halogen atom and all Zs may be either the same or different. The character "a" represents a number satisfying $0<a\leq 3$, b represents an integer not smaller than 2, and c represents an integer not smaller than 1.

(C): A boron compound selected from the following (C1) to (C3):

(C1) A boron compound represented by the general formula $BQ^1Q^2Q^3$ (C2) A boron compound represented by the general formula $G+(BQ^1Q^2Q^3Q^4)$ (C3) A boron compound represented by the general formula $(L-H)+(BQ^1Q^2Q^3Q^4)$ In the general formulas, B represents a trivalent boron atom, $Q^1$ to $Q^4$ each represents a halogen atom, a hydrocarbon group, a halogenated hydrocarbon group, a substituted silyl group, an alkoxy group or a di-substituted amino group and may be either the same or different, G+is an inorganic or organic cation, L is a neutral Lewis base, and (L-H)+is a Brensted acid.

(A) Transition metal complex

The transition metal complex represented by the general formula [I] may be reared, for example, by the method disclosed in WO97/03992-A. The transition metal complexes represented by the general formulas [II] and [III], respectively, may be prepared by reacting the transition metal complex represented by the general formula [I] with water in an amounts of 0.5 molar time and 1 molar time that of the transition metal complex [I]. In their reparation, there may be applied, for example, a method wherein the transition metal complex represented by the general formula [I] is directly reacted with a required amount of water and a method wherein the transition metal complex represented by the general formula [I] is put into a dry solvent such as hydrocarbons and is further passed through an inert gas and the like containing a required amount of water.

(B) Aluminum compound

Examples of the aluminum compound (B) include triethylaluminum, triisobutylaluminum, methylaluminoxane and other alkylalmoxanes.

(C) Boron compound

Examples of the boron compound (C) include triphenylmethyl tetrakis(pentafluorophenyl)borate, tri(n-butyl) ammonium tetrakis(pentafluorophenyl)borate and N,N-dimethylanilinium tetrakis(pentafluorophenyl)borate.

In the present invention, the resin having a glass transition point in the range of 10° C. to 50° C. may contain talc, antioxidant, anti-weathering agent, lubricant, anti-blocking agent, antistatic agent, anti-blooming agent, non-dropping agent, coloring agent, filler and the like as appropriate. Furthermore, insofar as the effect of the present invention is deteriorated, the resin may contain polymer substances by radical polymerization such as low-density polyethylene, high-density polyethylene, linear low-density polyethylene, ethylene/α-olefin elastomer, polyroylene, polystyrene and the like as appropriate.

As described above, the covering material of the present invention having a layer formed of a resin of which glass transition point is in the range of 10° C. to 50° C. is normally in the form of sheet or film, however, there is no special limitation for the thickness thereof.

Since the layer formed of the specific resin is excellent in the shape keeping ability and the shape recovering ability, the covering material of the present invention is excellent in the shape keeping ability and the shape recovering ability. The covering material of the present invention may be composed of only the layer formed of a resin of which transition point is in the range of 10° C. to 50° C. For example, a single-layer sheet formed of a copolymer of (a) ethylene and/or α-olefin and (b2) alkenyl aromatic hydrocarbon, and a single-layer sheet formed of a copolymer of (a) ethylene and/or α-olefin and both of (b1) cyclic olefin and (b2) alkenyl aromatic hydrocarbon exhibit excellent heat seal property with respect to a container in which at least its surface is formed of polystyrene or polyethylene, so that such single-layer sheets may be used as a covering material as they are.

Furthermore, the covering material of the present invention may be a laminate having an appropriate sealant layer. Also, insofar as the effect of the present invention is not significantly deteriorated, the covering material of the present invention may have other layers (for example, adhesive layer, heat resistant protecting layer, printing layer, gas-barrier layer, light resistant layer and the like) in addition to the layer of the above-mentioned resin having a transition point in the range of 10° C. to 50° C. and sealant layer. As a material for the heat resistant protecting layer, poly(ethylene terephthalate), nylon, polyroylene and the like can be exemplified. As a material for the gas-barrier layer, poly(vinylidene chloride), saponified ethylene/vinyl acetate copolymer and the like can be exemplified. Light resistant layer refers to a layer intended for shielding visible light and ultraviolet light, and examples of the light resistant layer include a synthetic resin layer having inorganic articles such as titanium oxide particles, paper layer, ink layer, vapor deposition layer and the like.

The single-layer covering material formed of a resin having a glass transition point in the range of 10° C. to 50° C. may be produced according to various kinds of methods including inflation method, T die method, pressing method.

The covering material comprising a laminate including a layer of a resin having a glass transition point in the range of 10° C. to 50° C. may be produced according to the inflation method, T die method, pressing method and the like by co-extrusion. Also it may be possible to produce the covering material by laminating films for respective layers which are produced separately, according to the dry lamination method using two-liquid reactive adhesive or the sandwich lamination method and the like. Each film for respective layers of the laminate may be produced according to various kinds of methods such as inflation method, T die method, pressing method and the like.

The covering material of the resent invention, when deformed by the action of the external force, expresses excellent shape keeping ability to keep the deformed condition, and exhibits excellent shape recovering ability after deformation.

EXAMPLES

In the following, the present invention will be explained with reference to the examples, however, the present invention is not limited to the examples.

Test methods <Shape keeping test (1)>

At 23° C., a test piece 1 cut out into a 50 mm square of 0.3 mm in thick was bent on the base with fingers, and kept for 10 seconds [FIG. 1(A)]. Next, 10 seconds and 1 minute after moving the fingers off the test piece, the bent angle A was measured [FIG. 1(B)]. The larger the bent angle A, the more excellent the shape keeping ability is.

<Shape keeping test (2)>

Figure 2:
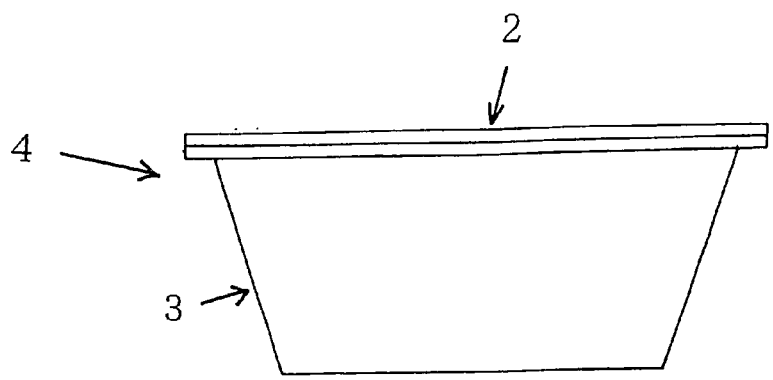
FIG. 2 is a schematic view for explaining procedure of a shape keeping test (2) of covering material.
Figure 2:
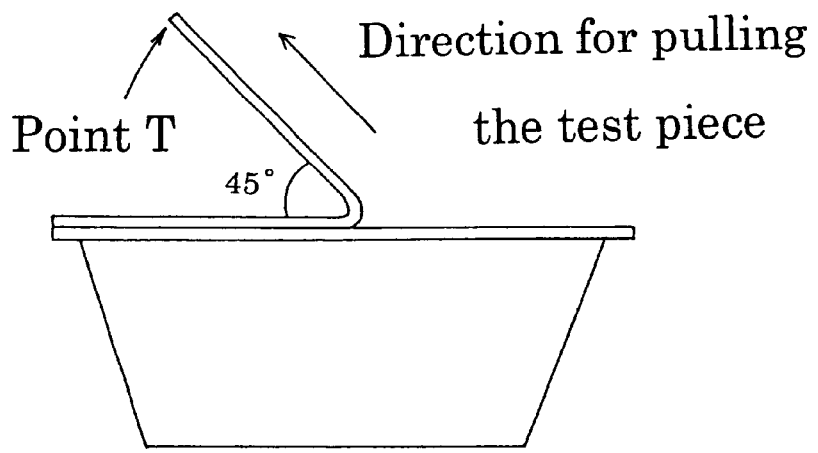
Figure 2:
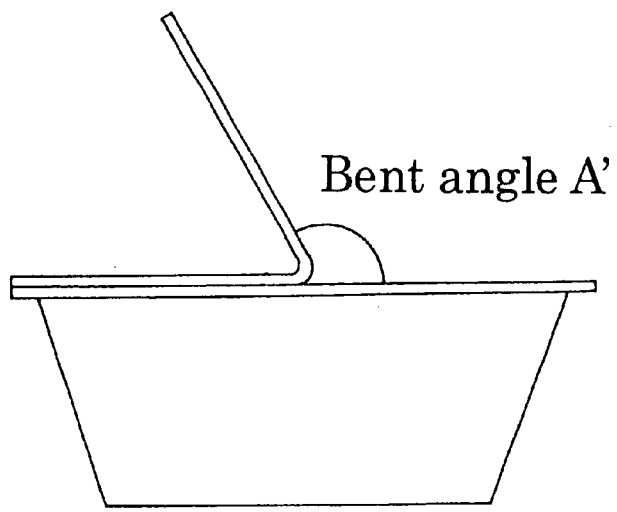

A test piece (cap) 2 cut into a circle having a diameter of 70 mm and a thickness of 0.3 mm, and a plastic (polystyrene or polypropylene) lower container 3 having a circular opening of an inside diameter of 62 mm which is surrounded by a flange portion of 3 mm in width were prepared. The test piece was heat sealed at 180° C. on the flange portion of the lower container, thereby creating a sealed container 4 [FIG. 2(A)]. One end of the test piece [the point T in FIG. 2(B)] was picked while the lower container being fixed; the test piece was peeled off the lower container by pulling the test piece in the direction of 45° with respect to the unpeeled art of the test piece, and the sealed container was opened up to the mid art of the opening of the lower container [FIG. 2(B)]. After opening, the bent angle A' of the test piece which was released from the external force was measured [FIG. 2(C)]. The larger the bent angle, the more excellent the shape keeping ability.

<Glass transition point and melting point of resin>

Glass transition point (Tg) and melting point (TM) were measured using a differential scanning calorimeter (DSC) (SSC-5200, manufactured by Seiko Instruments Inc.) under the conditions as follows:

Preheating: Heat from 20° C. to 200° C. (20° C./min.), Retain at 200° C. for 10 minutes Precooling: Cool from 200° C. to −50° C. (20° C./min.), Retain at −50° C. for 10 minutes Measuring: Heat from −50° C. to 300° C. (20° C./min.)

<Content of units from styrene in resin and resin structure>

Content of units from styrene in a copolymer and the structure of the copolymer were determined by $^{13}$C-NMR (JNM-EX270, manufactured by JEOL Ltd.) analysis.

Measuring solvent: 85:15 (weight ratio) mixture of o-dichlorobenzene and heavy benzene.

Measuring temerature: 135° C.

<Solid dynamic viscoelasticity>

Solid dynamic viscoelasticity of resin was determined using a sectrometer (Measurement Analyzer LEO STATION SDM5600H manufactured by Seiko Instruments Inc. connected with a Tension Module DMS200) under the conditions as follows:

Test piece: press sheet of 20 mm×3.0 mm×0.3 mm

Frequency: 5 Hz

Heating seed: 2° C./min.

Displacement amplitude: 10 $\mu$m

Example 1

In a 100 mL autoclave replaced by argon, 15 ml of dehydrated toluene, 1.0 ml (1 mmol) of triisobutylaluminum solution in toluene [1 mol/l, manufactured by Tosoh Akzo Co. Ltd.], 1.5 mg (4 $\mu$mol) of isoroylidene (cyclopentadienyl) (3-tert-butyl-5-methyl-2-phenoxy)titanium dichloride dissolved in 1.5 ml of dehydrated toluene, 11.1 mg of phenylmethyltetrakis(pentafluorophenyl) borate dissolved in 2.4 ml of dehydrated toluene (12 $\mu$mol), and 20 ml of styrene were sequentially added, and finally 2 kg/cm$^2$ of ethylene was supplied. After stirring the reaction mixture at 60° C. for 1 hour, the reaction mixture was put into a mixture of 1 ml hydrochloride (12N) and 300 ml methanol and precipitated white solid was obtained by filtering. After washing the solid with methanol, vacuum dry of the solid resulted in 1.89 g of polymer (ethylene/styrene copolymer). Glass transition point of this polymer was 34° C., with its melting point substantially not confirmed, and content of units from styrene was 50 mol %. From measurement of solid dynamic viscoelasticity, the maximum value of tan δ was 1.99.

Using this resin, a 0.3 mm thick sheet was produced by a tabletop press machine. The shape keeping ability test (1) and the shape keeping ability test (2) were carried out for this sheet. The results are shown in Table 1. As the lower container, a polystyrene container was used. It was proved that this sheet is excellent in the shape keeping ability. Moreover, when the test piece bent in the shape keeping ability test (1) was recovered to the original condition before bending, the test piece recovered the shape before bending without causing wrinkles at the bent portion.

Example 2

In a 400 mL autoclave replaced by argon, after preliminarily introducing 46 ml of styrene, 4 ml of norbornene solution in toluene (5 mol/l) and 102 ml of dehydrated toluene, 0.8 MPa of ethylene was supplied. To this mixture, a mixture consisting of 3.0 ml of triisobutylaluminum solution in toluene [1 mol/l, manufactured by Tosoh Akzo Co. Ltd.] and a solution obtained by dissolving 15.5 mg of isopropylidene(cyclopentadienyl)(3-tert-butyl-5-methyl-2-phenoxy)titani um dichloride in 15 ml of dehydrated toluene was added, then a solution obtained by dissolving 96.1 mg of N,N-dimethylaniliniumtetrakis(pentafluorohenyl) borate in 30 ml of dehydrated toluene was added, and the reaction mixture was stirred at 60° C. for 2 hours. Thereafter the reaction mixture was put into a mixture of 5 ml hydrochloride (12N) and 1000 ml acetone and precipitated white solid was obtained by filtering. After washing the solid with acetone, vacuum dry of the solid resulted in 32.82 g of polymer (ethylene/styrene/norbornene copolymer). Glass transition point of this polymer was 27° C., content of units from styrene was 39 mol %, and content of units from norbornene was 3 mol %.

Using this resin, a 0.3 mm thick sheet was produced by a tabletop press machine. The shape keeping ability test (1) and the shape keeping ability test (2) were carried out for this sheet. The results are shown in Table 1. In the shape keeping ability test (2), a polystylene container was used as the lower container. It was proved that this sheet is excellent in the shape keeping ability. Moreover, when the test piece bent in the shape keeping ability test (1) was recovered to the original condition before bending, the test piece recovered the shape before bending without causing wrinkles at the bent portion.

Comparative Example 1

Using a propylene/ethylene random copolymer (SUMITOMO NOBLEN® RS160XG manufactured by Sumitomo Chemical Co. Ltd., Tm=135° C., Tg=−1° C.), a 0.3 mm thick sheet was produced by a tabletop press machine. The shape keeping ability test (1) and the shape keeping ability test (2) were carried out for this sheet. The results are shown in Table 1. In the shape keeping ability test (2), a polypropylene container was used as the lower container. This sheet was significantly poor in shape keeping ability.

Comparative Example 2

Using polystyrene (H550 manufactured by Japan Polystyrene Co. Ltd., Tg=100° C.), a 0.3 mm thick sheet was produced by a tabletop press machine. The shape keeping ability test (1) and the shape keeping ability test (2) were carried out for this sheet. The results are shown in Table 1. In the shape keeping ability test (2), a polypropylene container was used as the lower container. This sheet was significantly poor in shape keeping ability. Moreover, when the test piece bent in the shape keeping ability test (1) was recovered to the original condition before bending, wrinkles occurred at the bent portion.

TABLE 1

| | Tg (° C.) | Shape keeping test (1) | | Shape keeping test (2) |
| --- | --- | --- | --- | --- |
| | | after 10 sec. | after 1 min. | |
| Example 1 | 34 | 165° | 145° | 70° |
| Example 2 | 27 | 125° | 90° | 60° |
| Comparative Example 1 | −1 | 5° | 5° | 5° |
| Comparative Example 2 | 100 | 30° | 30° | 5° |

What is claimed is:

1. A covering material having a layer formed of a resin of which glass transition point is in the range of 10° C. to 50° C., wherein the resin is a copolymer of (a) ethylene and/or α-olefin and both of (b1) cyclic olefin and (b2) alkenyl aromatic hydrocarbon.

2. The covering material according to claim 1, wherein the resin is amorphous resin.

* * * * *